United States Patent [19]
Otomo

[11] Patent Number: 6,104,283
[45] Date of Patent: Aug. 15, 2000

[54] PEST ANIMAL REPULSING APPARATUS

[75] Inventor: Hirotaka Otomo, Tokyo, Japan

[73] Assignee: Cats, Inc., Tokyo, Japan

[21] Appl. No.: 08/798,930

[22] Filed: Feb. 11, 1997

[51] Int. Cl.$^7$ .................................................. G08B 3/10
[52] U.S. Cl. .................................. 340/384.2; 340/384.1; 340/384.7; 367/139; 381/85; 381/123
[58] Field of Search .............................. 340/384.2, 384.1, 340/384.6, 384.7; 367/139; 43/17.1; 116/22 A; 381/85, 123

[56] References Cited

U.S. PATENT DOCUMENTS

| | | | |
|---|---|---|---|
| 3,636,559 | 1/1972 | Del Grande et al. | 340/384.2 |
| 3,893,106 | 7/1975 | Schulein | 340/384.2 |
| 4,563,759 | 1/1986 | Hayakawa | 340/384.2 |
| 5,602,523 | 2/1997 | Turchioe et al. | 340/384.2 |

*Primary Examiner*—Jeffrey Hofsass
*Assistant Examiner*—Anh La
*Attorney, Agent, or Firm*—Wenderoth, Lind & Ponack

[57] ABSTRACT

The apparatus according to the present invention is provided with two or more output systems to which transducers are connected, a source output on/off control unit that turns on/off the output from a source based upon the output from a random signal generating unit and a frequency varying unit that causes changes in the frequency of an electrical signal provided to the transducers over time at a specific rate. Every time the source output is turned off, the output of the electrical signal is stopped and the output systems are switched over, whereas when the source output is on, the electrical signal provided to the transducers on the output system to which the signal is to be provided. Since the output systems are switched over to be selected for use, it becomes possible to connect a greater number of transducers while using the same source capacity as in the prior art and noise generated from the transducers, when switching over the output systems, is eliminated.

12 Claims, 8 Drawing Sheets

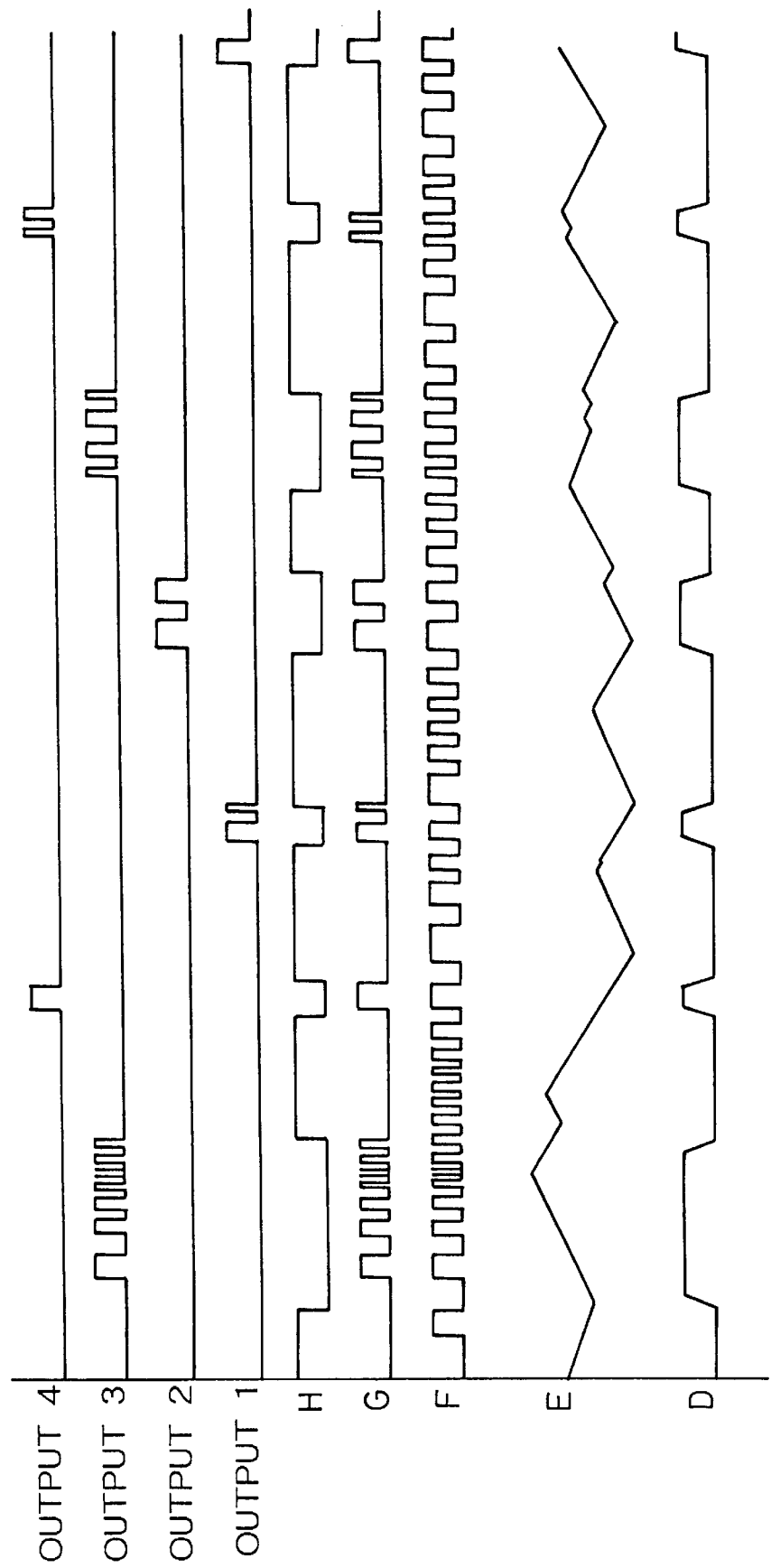

PEST ANIMAL REPULSING APPARATUS

BACKGROUND OF THE INVENTION

1. Field of the Invention

The present invention relates to a pest animal repulsing apparatus which utilizes ultrasonic waves that are generated randomly to intimidate and repulse pest animals such as rats and to prevent them from entering a designated area such as a residential building, supermarket, department store or the like.

2. Description of the Related Art

In view of the fact that pest animals such as rats dislike ultrasonic waves within a specific range, apparatuses in the known art that repulse rats and the like by emitting ultrasonic waves toward the area where the rats and the like live are disclosed, for instance, in Japanese Examined Patent Publication No. S 61-49 and Japanese Examined Patent Publication No. S 63-16.

The apparatus that is disclosed in the former publication, i.e., Japanese Examined Patent Publication No. S 61-49, creates a control signal by superimposing a trigger signal generated at a trigger signal generator upon a random signal generated at a random signal generator and provides this control signal to an oscillating circuit to cause random changes in the oscillating frequency. An intimidating signal is thereby formed that contains an impulsive sound component whereby changes in frequency such that a rapid change from a reduction to an increase in frequency occurs within this randomly generated oscillating frequency. The intimidating signal is changed by a transducer to ultrasonic waves that contain impulsive sound.

In addition, in the apparatus disclosed in the latter publication, i.e., Japanese Examined Patent Publication No. S63-16, in which the trigger signal in the apparatus disclosed in the former publication is eliminated, a control signal corresponding to the output of a random signal generator is provided to an oscillating circuit to cause random changes in the oscillating frequency. An intimidating signal is thereby formed that contains an impulsive sound component whereby rapid changes from a reduction to an increase in frequency occur within this randomly generated oscillating frequency and the intimidating signal is changed to ultrasonic waves that contain impulsive sound by a transducer.

However, with the apparatuses described above, which intimidate rats and the like by simultaneously generating random ultrasonic waves and impulse waves, if such apparatuses are to cover a wide range of area, a plurality of transducers must be connected to the oscillating circuit via the amplifying circuits, and this may present a problem of an insufficient source capacity. Thus, a wide ranging area cannot be covered unless the source capacity of the apparatus is increased so as to make it possible to increase the number of transducers which can be connected.

In addition, while the applicant of the present invention has been conducting research into a method in which output systems for ultrasonic waves are switched in order to prevent rats and the like from becoming accustomed to the ultrasonic waves, there is a problem in that, when the output systems for the ultrasonic waves that are outputted continuously are switched, noise is generated at the transducers when switching the output systems.

SUMMARY OF THE INVENTION

Accordingly, an object of the present invention is to provide a pest animal repulsing apparatus that is capable of driving more transducers than has been previously possible in the prior art using the same source capacity and that ensures no noise is generated from the transducers when switching the output systems while employing a method whereby the output systems are switched in order to achieve the repulsing effect on the pest animals imparted by ultrasonic waves.

In order to achieve the object described above, the pest animal repulsing apparatus according to the present invention comprises, as shown in FIG. 1, two or more output systems to which transducers 1 for converting electrical signals to mechanical vibrations are connected with power supplied to the transducers 1 from a common source, a random signal generating unit 2 that generates random signals, a source output on/off control unit 3 that turns on/off the output from the source based upon the output from the random signal generating unit 2, a frequency varying unit 4 that changes the frequency of the electrical signal provided to the transducers 1 over time at a specific rate and an output switching unit 5 that stops the output of the electrical signal and switches over to the output system to which the electrical signals are to be provided each time the source output is turned off so that, when the source output is turned on, the transducers connected to the active output system receive the electrical signals.

In one mode, the pest animal repulsing apparatus may comprise a set of speakers to which power is supplied from a common source so that electrical the signals can be converted to sound wave motion, a random signal generating unit that creates random signals by generating noise, a source output on/off control unit that turns the output from the source on and off based upon the output from the random signal generating unit, a frequency varying unit that creates a pulse signal in which the frequency sweeps at a specific rate and causes the frequency of the electrical signal provided to the speakers to change based upon the pulse signal, a source-off detection circuit that detects that the source output is in an off state and an output switching unit that stops the output of the electric signal and sequentially switches over the speakers to which the electric signals are to be provided every time the source output is turned off and, when the source output is turned on, provides the electrical signal to the speakers to which the switch-over has been made.

In this structure, since the output from the source at the source output on/off control unit 3 is turned on/off based upon a random signal generated at the random signal generating unit 2, the length of time over which the source is on and the length of time over which the source is off are varied randomly. While the electrical signal created at the frequency varying unit 4, which changes over time at a specific rate, may be provided to a plurality of output systems, the output switching unit 5 stops the output of the electrical signal each time the source output is turned off and, during the period of time that the source output remains off, switches over to the output system to which the electrical signal is to be provided. Then, when the source output is turned on, the electrical signal is provided to the transducers 1 on the newly designated output system to which the signal has been switched.

Since the frequency of the electrical signal provided to the transducers 1 changes over time at a specific rate, no impulse wave is formed due to rapid changes in frequency. However, the on period of the source over which the electrical signal is provided to the transducers 1 is dependent upon a random signal, thus an electrical signal created during each on period will include varying frequency changes and, as a result, the ultrasonic waves output by the transducers will also be random. Moreover, since the periods over which the source is turned off are also random, the switching cycle for the transducer will be random.

In addition, while a plurality of transducers are provided, since the output systems for outputting ultrasonic waves are being switched among by the output switching unit, the plurality of transducers can be driven without increasing the source capacity over that of the prior art. Furthermore, since the switching of the output systems is performed while the source output is turned off, the problem of noise being generated by the transducers is eliminated.

In a more specific structural example, the output switching unit 5 may include a source-off detection circuit constituted by a logic gate that outputs a positive logic level when the output of the source is in an off state, a decode counter into which the output signal from the source-off detection circuit is inputted and a switching element that is connected to an output terminal of the decode counter to interrupt the output system so that every time the output from the source is turned off, the output systems are switched sequentially.

The frequency varying unit 4 may include a triangular wave generating circuit that generates triangular waves so that a pulse signal whose frequency changes over time can be created by changing the oscillating frequency in correspondence to the output voltage from the triangular wave generating circuit. In addition, the frequency varying unit 4 may include an integrating circuit that integrates the randomly changing signal that corresponds to the output from a random signal generating unit 2 so that a pulse signal, whose frequency changes over time, can be created by changing the oscillating frequency in correspondence to the output voltage from the integrating circuit. Furthermore, a pulse signal whose frequency changes over time may be achieved by switching between them selectively. In particular, if a pulse signal obtained from an integrating circuit is utilized, the range over which the frequency sweeps becomes random in addition to achieving random output periods and random timing for switching the output systems, thereby making it possible to output even more random ultrasonic waves compared to those achieved with triangular waves.

Moreover, means for adjusting the output level of an electrical signal may be provided in correspondence to the individual transducers. For instance, when the output of the source is converted by the frequency varying unit 4 to a signal whose frequency fluctuates, to be provided to the transducers, the voltage level may be adjusted by the output voltage adjusters that are provided in correspondence to the individual output systems. By adding these structural features, settings such as changes in the output level and pauses in the output can be made freely for each output system depending upon the location of installation of the apparatus according to the present invention.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate a preferred embodiment. In the drawings:

FIG. 8 is a waveform diagram illustrating examples of signals D~H shown in FIGS. 2 through 6 and the output signals from the output switching circuit that are generated when the output from the integrating circuit is utilized selectively.

DETAILED DESCRIPTION OF THE PREFERRED EMBODIMENT

Figure 1:
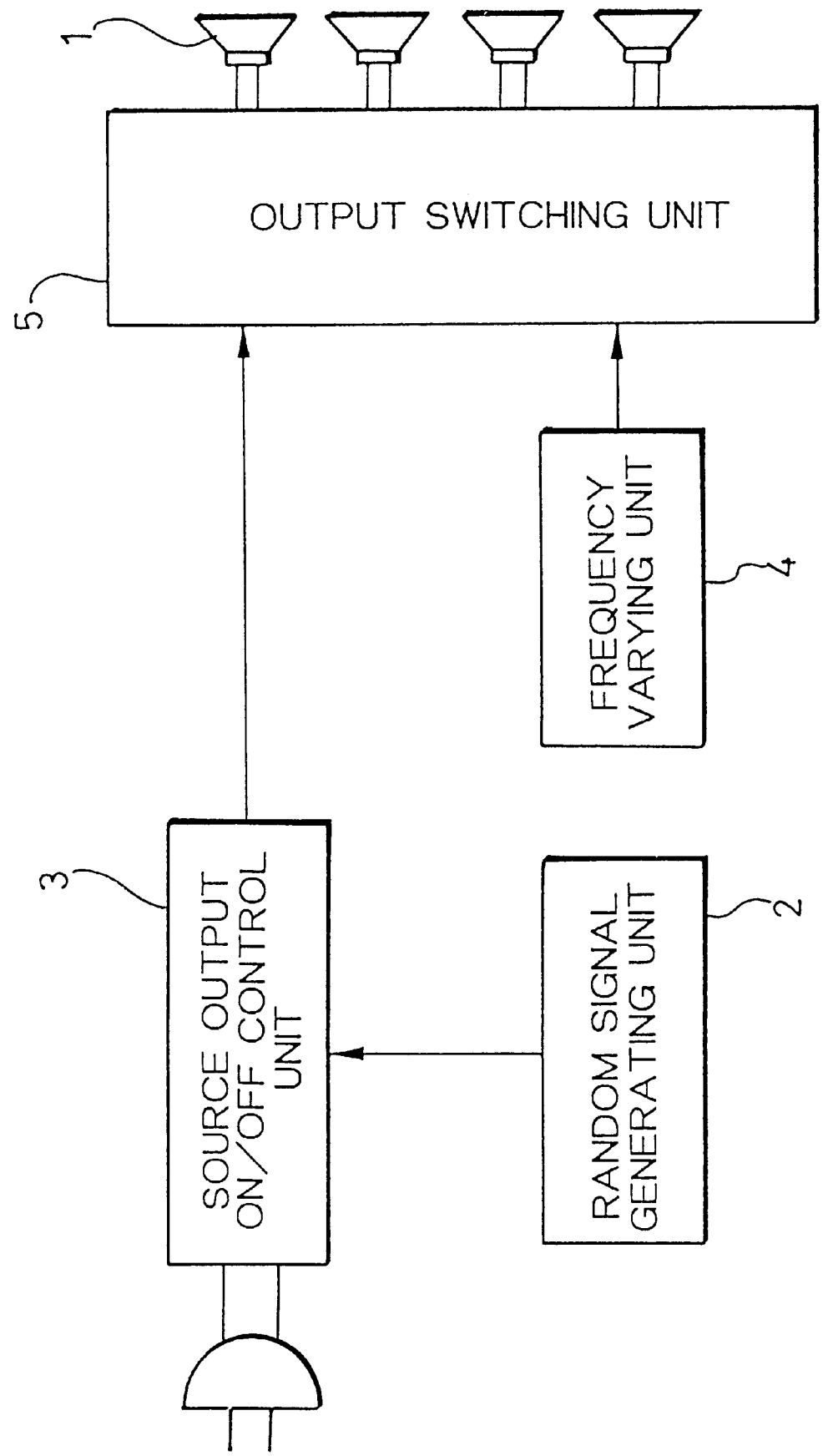
FIG. 1 is a functional block diagram that illustrates the overall structure of the present invention.

The following is an explanation of an embodiment of the present invention with reference to the drawings. In FIG. 2, which shows a more specific functional block diagram of the pest animal repulsing apparatus according to the present invention shown in FIG. 1, the pest animal repulsing apparatus comprises a low range noise generating circuit 6 that amplifies low range noise to convert it to a digital signal, a frequency divider circuit 7 that divides the frequency of the noise signal in conformance to the on/off of the source, a source mute circuit 8 that turns off the output from a variable voltage source circuit 10 based upon the signal from the frequency divider circuit 7 and an output voltage adjusting circuit 9 that adjusts the output voltage generated at the variable voltage source circuit 10.

In addition, the apparatus according to the present invention is provided with a triangular wave generating circuit 12 that generates a triangular wave with a reference voltage at the center created at a reference voltage adjusting circuit 11, an integrating circuit 13 that integrates random signals output from the frequency divider circuit 7 based upon the noise signal while comparing it to the reference voltage, a voltage control oscillator (VCO) 14 that selects either the output from the triangular wave generating circuit 12 or the output from the integrating circuit 13 to cause the frequency to change in correspondence to the output level, a rectangular wave amplifier 15 that converts the output of the source voltage to an electrical signal whose frequency fluctuates based upon the output from the VCO, a source-off detection circuit 16 that detects that the source voltage has been turned off and an output switching circuit 17 that, while the source voltage is turned off, performs switching of the output speakers (transducers 1 shown in FIG. 1) to select the speakers that are to perform the outputting and causes the outputted from the rectangular wave amplifier 15 to be output through the speakers that have been selected.

Figure 2:
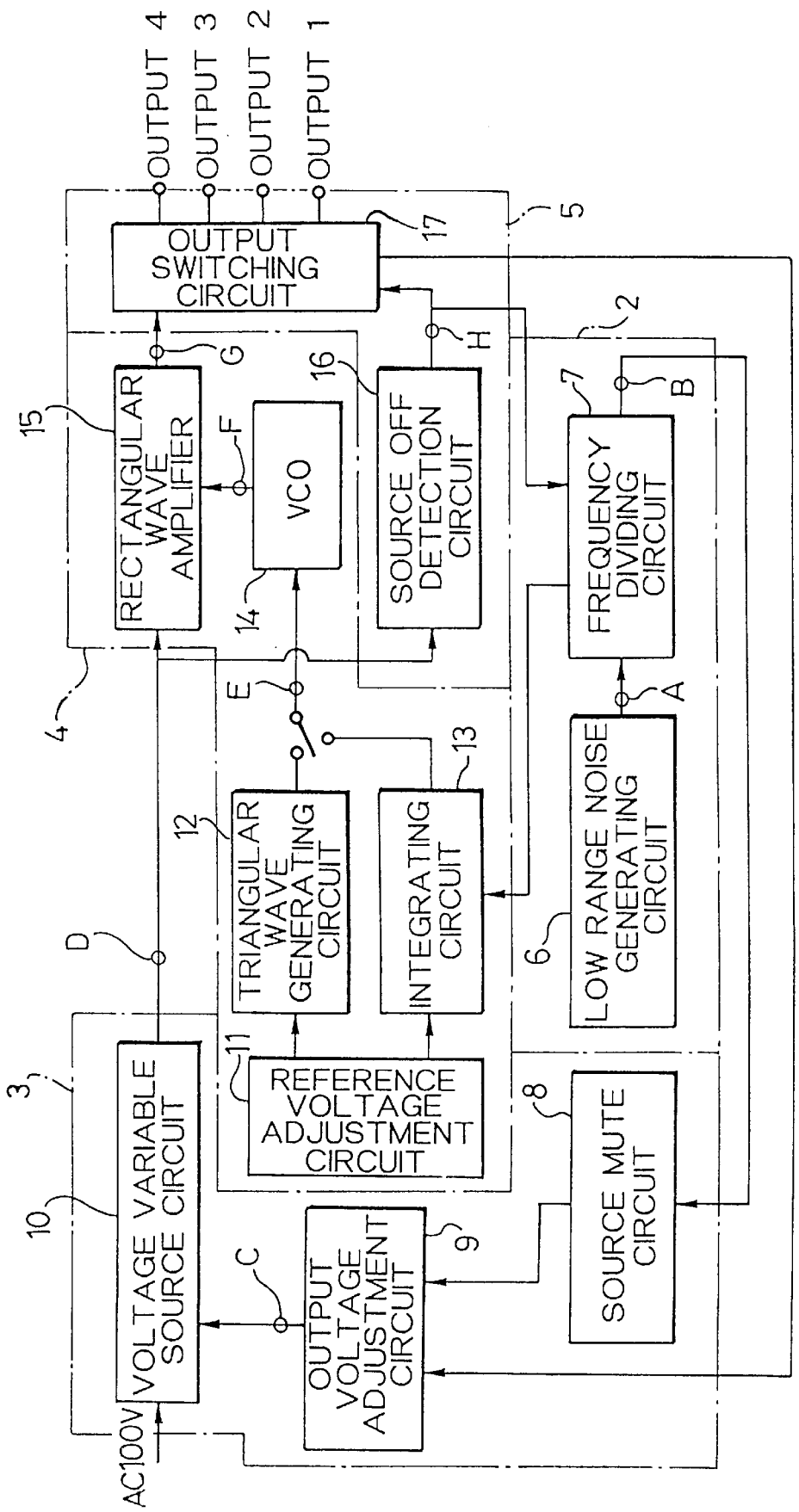
FIG. 2 is a block diagram showing an embodiment of the present invention.

The random signal generating unit 2 in FIG. 1 corresponds to the low range noise generating circuit 6 and the frequency divider circuit 7 shown in FIG. 2, the source output on/off control unit 3 in FIG. 1 corresponds to the source mute circuit 8, the output voltage adjusting circuit 9 and the variable voltage source circuit 10 shown in FIG. 2, the frequency varying unit 4 in FIG. 1 corresponds to the reference voltage adjusting circuit 11, the triangular wave generating circuit 12, the integrating circuit 13, the VCO 14 and the rectangular wave amplifier 15 shown in FIG. 2, and the output switching unit 5 in FIG. 1 corresponds to the source-off detection circuit 16 and the output switching circuit 17 shown in FIG. 2.

Figure 3:
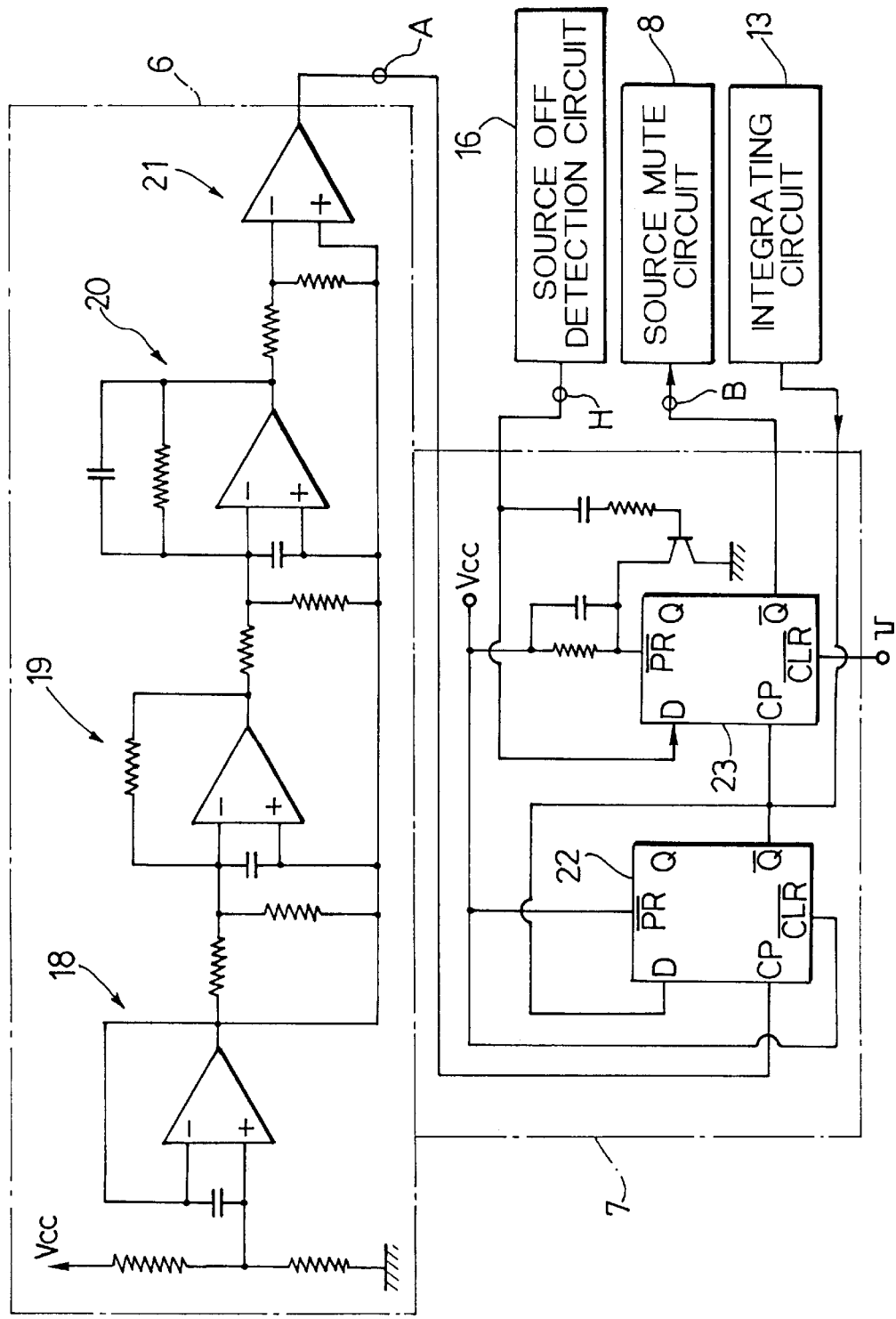
FIG. 3 is a circuit diagram showing an example of the low range noise generating circuit 6 and the frequency divider circuit 7 in FIG. 2.

As shown in FIG. 3, the low range noise generating circuit 6 is constituted with a type of A/D converter that converts noise in a semiconductor to a pulse signal, and random noise generated at the semiconductor is inputted to an inverting amplifier 19 via a buffer amplifier 18. Its output is then inputted to a comparator 21 via an integrating circuit 20 and by comparing this with the output from the buffer amplifier 18, a pulse signal that corresponds to the random noise is obtained. An output A from the low range noise generating circuit 6 is made to have the signal waveform indicated by A in FIG. 7, for instance, by a logic analyzer.

Figure 7:
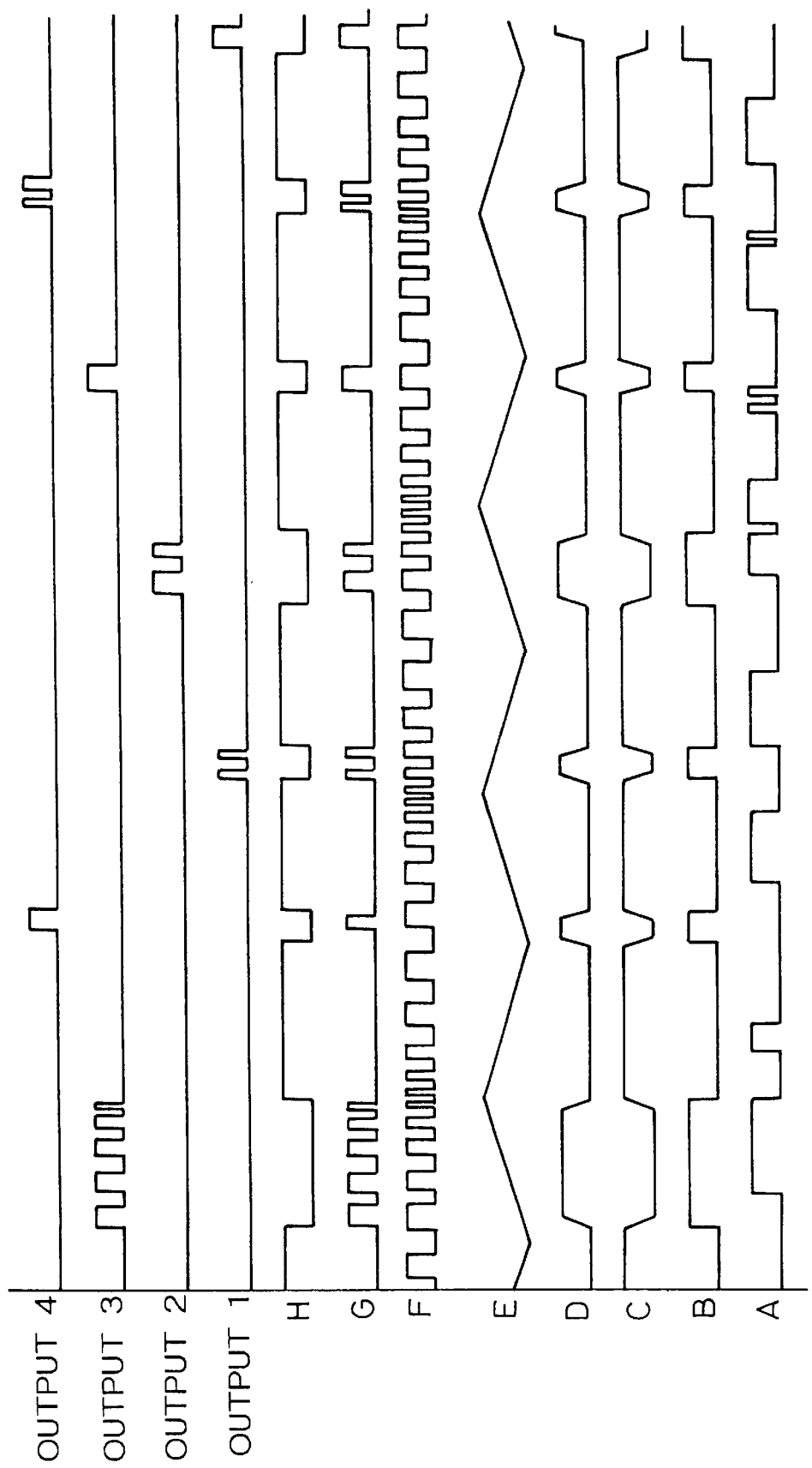
FIG. 7 is a waveform diagram illustrating examples of signals A~H shown in FIGS. 2 through 7 and the output signals from the output switching circuit that are generated when the output from the triangular wave generating circuit is utilized selectively.

The frequency divider circuit 7 is constituted by connecting two "74HC74" elements, which are known in the prior art as CMOS D-type Hi speed flipflop ICs (22, 23). The output from the low range noise generating circuit 6 is inputted to a clock input terminal CP of the D-FF (22) at the first stage. This first stage D-FF (22) constitutes a T-FF, which is engaged in an up-edge operation and at the D-FF (23) at the second stage, the output from the first stage D-FF (22) is inputted to a CP terminal, so that an output H from the source-off detection circuit 16, which is to be detailed later, is inputted to a D terminal and a signal that achieved by inverting this is input to a preset terminal (PR) during a rise of the output H. In addition, a signal whose logical level is set to Low during the rise of the output D, which is to be detailed later, is inputted to a CLR terminal at the second stage D-FF (23). Consequently, the signal indicated by B in FIG. 7 is obtained in correspondence to the random signal from the low range noise generating circuit 6 that is indicated by A in FIG. 7.

Synchronization with the on/off of the source output is achieved as well as synchronization with the noise signal in this manner to ensure that, since noise will be generated unless the speakers are switched over when the source is turned off, frequency division for the noise signal is not performed during a source off period, as will be described in more detail later. Because of this, even when there is a request for a random output, the noise signal is not admitted at the second stage D-FF (23) during a source off period and the signal is admitted only after the source is turned on.

Figure 4:
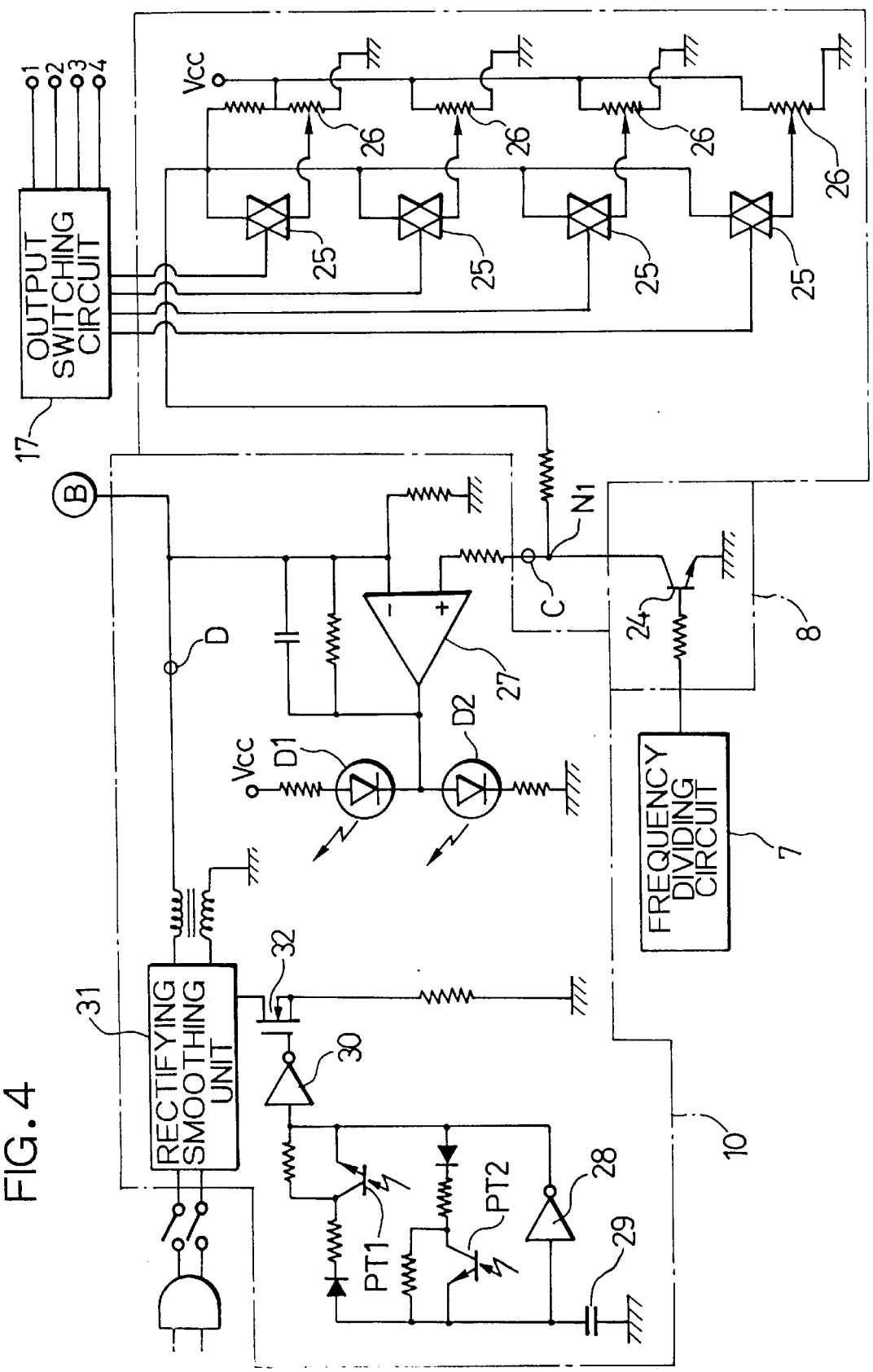
FIG. 4 is a circuit diagram presenting an example of the source mute circuit 8, the output voltage adjusting circuit 9 and the variable voltage source circuit 10 in FIG. 2.

An output B from the frequency divider circuit 7 (output from a Q-bar terminal at the second stage D-FF) is inputted to the source mute circuit 8. As shown in FIG. 4, the source mute circuit 8 is provided with a transistor 24 which constitutes a switching element and is emitter grounded. The output from the frequency divider circuit 7 is inputted to a base terminal of the transistor 24 with its connector terminal constituting an output terminal. Thus, the collector voltage is turned on/off as the base voltage shifts and the waveform achieved by inverting the output from the frequency divider circuit 7 is outputted from the source mute circuit 8.

The output terminal of the source mute circuit 8 is connected to the output voltage adjusting circuit 9, which is provided with transmission gates 25 and voltage adjustment variable resistors 26, which are assigned to individual output terminals of the output switching circuit 17. The transmission gate 25, corresponding to the output terminal to which the signal is output from the output switching circuit 17, is turned on and continuity is achieved between the output side of the source mute circuit 8 and the voltage adjustment variable resistor 26, which varies the divided voltage of a source voltage Vcc. The transmission gates 25 are sequentially closed by the output switching circuit 17, which is to be detailed later, and the voltage at the output side of the source mute circuit 8 when the transmission gates 25 are closed can be varied by operating the voltage adjustment variable resistors 26. As a result, the waveform of the output from the source mute circuit 8 (or the output voltage adjusting circuit 9) when the signal indicated by B in FIG. 7 is inputted is as indicated by C in FIG. 7, the amplitude of which is determined by setting the voltage adjustment variable resistors 26.

In the variable voltage source circuit 10, a connection point N1 of the source mute circuit 8 and the output voltage adjusting circuit 9 is connected with a non-inverting terminal of an operational amplifier 27 and a source output line is connected with an inverting terminal, respectively, and the output terminal of the operational amplifier 27 is connected between two light emitting diodes (D1 and D2) that are connected in series relative to the constant voltage source. As a result, only the light emitting diode D1 emits light when the applied voltage at a non-inverting input terminal of the operational amplifier 27 has dropped to the ground level due to the closing of the transistor 24 at the source mute circuit 8, or when the applied voltage at the non-inverting input terminal becomes lower than the applied voltage at the inverting input terminal due to an adjustment made at the voltage adjustment variable resistors 26 while the transistor 24 remains open. In contrast, only the light emitting diode D2 emits light when the applied voltage at the non-inverting input terminal is higher than the applied voltage at the inverting input terminal.

In the variable voltage source circuit 10, a phototransistor PT1, which achieves continuity upon receiving light emitted by the light emitting diode D1, and a phototransistor PT2, which achieves continuity upon receiving light emitted by the light emitting diode D2, are connected in parallel via resistors and diodes so that their directions of electrical continuity are the reverse of each other. Moreover, an inverter 28 is provided in parallel with the emitter of the phototransistor PT2 connected to the ground via a capacitor 29 and the emitter of the phototransistor PT1 connected to the gate of a FET 32, which constitutes a snubber circuit in a rectifying smoothing unit 31.

In this structure, the light emitting diodes D1 and D2 are made to emit light selectively based upon the signal generated by the source mute circuit 8 and the output voltage adjusting circuit 9. When the phototransistor PT1 receives light, continuity at the FET 32 is interrupted and the output from the source circuit is set to Hi (ON). If, on the other hand, the phototransistor PT2 receives light, continuity is achieved at the FET 32 and the output from the source circuit is set to Low (OFF). For instance, if a signal with the waveform indicated with C in FIG. 7 is input to the variable voltage source circuit 10, the output from this circuit will be as indicated by D in FIG. 7.

Figure 5:
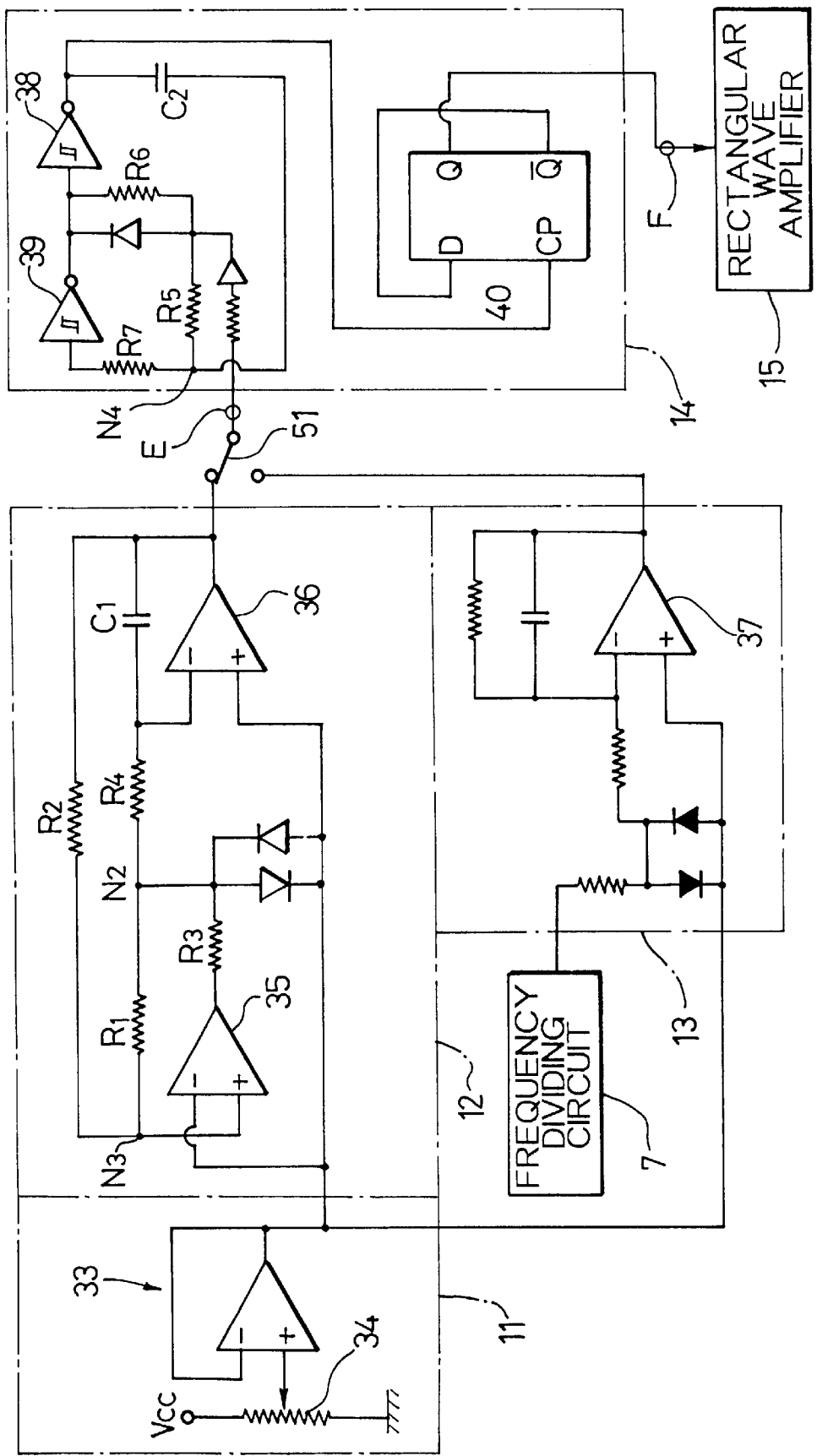
FIG. 5 is a circuit diagram of an example of the reference voltage adjusting circuit 11, the triangular wave generating circuit 12, the integrating circuit 13 and the VCO 14 in FIG. 2.

The reference voltage adjusting circuit 11 may be, for instance, the one shown in FIG. 5, in which a divided voltage, which is set by a variable resistor 34, is inputted to a non-inverting input terminal of a voltage follower 33 and the output from the voltage follower 33 can be varied depending upon the setting at the variable resistor 34 so that the reference voltage at the operational amplifier, which is to be detailed later, can be adjusted.

The triangular wave generating circuit 12 generates a triangular wave by integrating, for instance, a square wave. It employs an operational amplifier 35 as a comparator and the output voltage from the voltage follower 33 is inputted to an inverting input terminal of the operational amplifier 35, a saturation voltage node N2 of the operational amplifier 35 and the output terminal of an operational amplifier 36 are connected through resistors R1 and R2 and the voltage at the connection point N3 of the resistors R1 and R2 is input to a non-inverting terminal of the operational amplifier 35 to compare it with the output from the reference voltage adjusting circuit 11. In addition, the operational amplifier 36, together with a resistor R4 and a capacitor C1 constitutes an integrating circuit. As a result, the saturation voltage at the operational amplifier 35 forms a square wave and the output voltage from the operational amplifier 36 forms a triangular wave which is determined by the time constant of C1, R4. In FIG. 7, E represents an example the output waveform from the triangular wave generating circuit 12.

The integrating circuit 13 is constituted by inputting the output from the first stage D-FF(22), constituting the frequency divider circuit 7, to an inverting input terminal of an operational amplifier 37 and inputting the output from the reference voltage adjusting circuit 11 to its non-inverting terminal. Thus, the output from the first stage D-FF, constituting the frequency divider circuit 7, becomes a random pulse signal achieved by performing A/D conversion on noise and, consequently, the output from the integrating circuit 13, too, becomes a voltage with a waveform that fluctuates over a random amplitude. It is to be noted that the time constant at the integrating circuit 13 is set in such a manner that the speed at which the output from the integrating circuit changes is approximately equal to the speed at which the output from the triangular wave generating circuit 12 changes.

In the voltage control oscillator (VCO) 14, which is constituted by utilizing an astable multi-vibrator, when the output from an inverter 38 is set to Hi, a capacitor C2 is electrically charged and during the initial period of the charge, a voltage is generated at a connection point N4 of resistors R5 and R7. This voltage is then applied to an inverter 39 via the resistor R7, thereby setting the output from the inverter 39 to Low. The capacitor C2 is further electrically charged and the potential at the connection point N4 goes down gradually until it is at Low, thereby causing the output from the inverter 39 to become reversed to Hi and setting the output from the inverter 38 to Low so that the capacitor C2 becomes electrically charged in the reverse direction. As this charge in the reverse direction progresses, the potential at the connection point N4 gradually increases until it is at Hi, to reverse the output from the inverter 39 to Low and set the output from the inverter 38 to Hi so that the capacitor C2 is electrically charged in the forward direction again.

While oscillation is achieved by repeating this process, the waveform from the triangular wave generating circuit 12 or the integrating circuit 13 is inputted between the inverters so that the cycle of the output waveform is gradually changed in correspondence to the input voltage. In other words, as the voltage input between the inverters gradually increases, the charge period for the capacitor becomes reduced resulting in the cycle becoming gradually shortened, whereas as the voltage becomes gradually reduced, the cycle of the output waveform becomes lengthened. As a result, when the triangular wave indicated by E in FIG. 7 is inputted to the VCO 14, the output from the inverter 38 taken out via T-FF, which is constituted by a D-FF (40), will produce the waveform indicated with F in FIG. 7.

Figure 6:
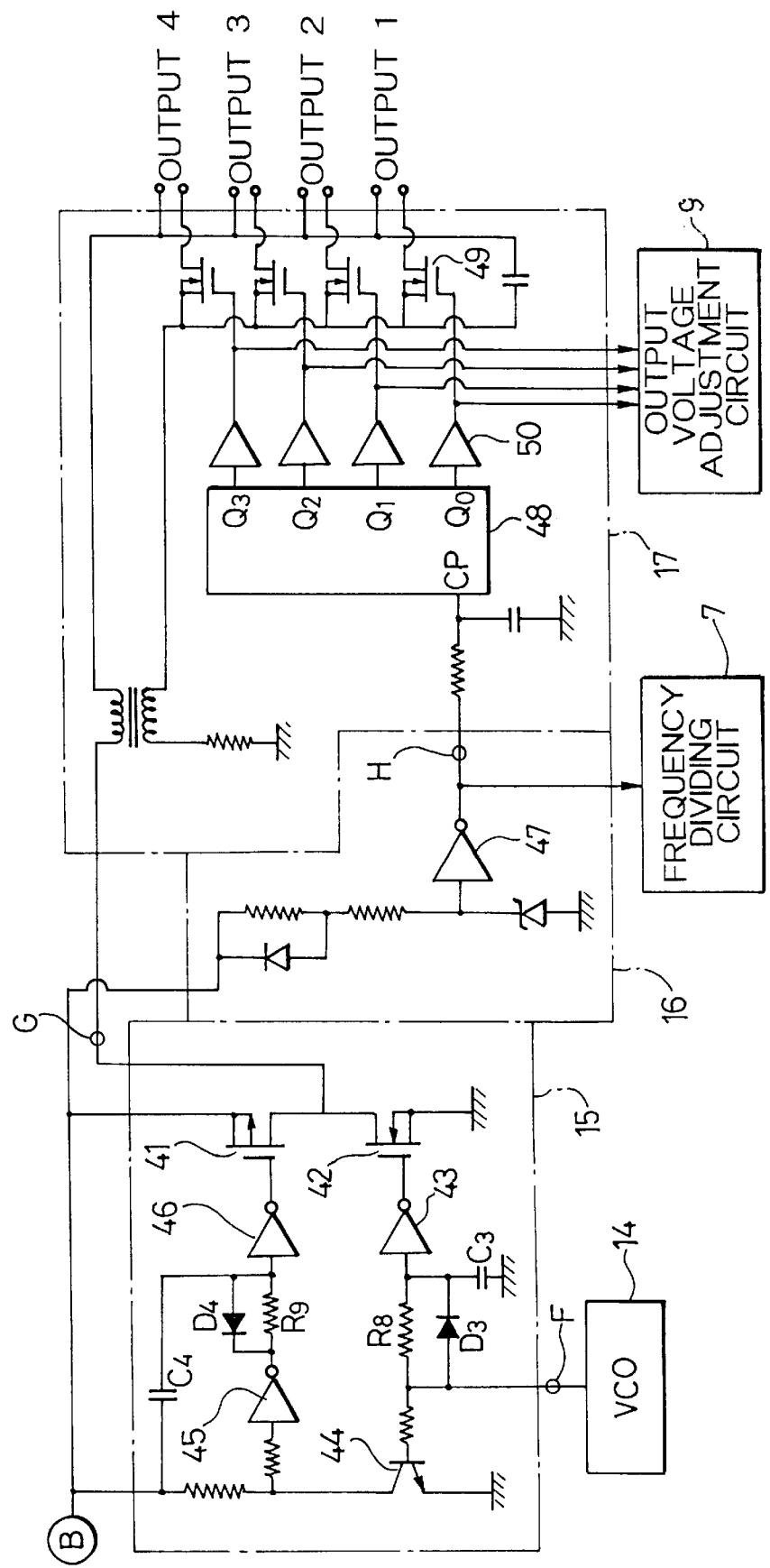
FIG. 6 is a circuit diagram presenting an example of the rectangular wave amplifier 15, the source-off detection circuit 16 and the output switching circuit 17 in FIG. 2.

As shown in FIG. 6, in the rectangular wave amplifier 15, a P- MOSFET (41) and an N- MOSFET (42) are connected in series to the output line from the variable voltage source circuit to input the output from the VCO 14 to the gate of the N- MOSFET (42) via an inverter 43 and also to the base of a transistor 44. In addition, the output from the variable voltage source circuit is inputted to the gate of the P- MOSFET (41) via inverters 45 and 46.

If the output from the VCO 14 is at Hi, the output from the inverter 43 is at Low and the N- MOSFET (42) is in a discontinuous state (OFF). At the same time, the transistor 44 enters a continuous state (ON) and while the output from the inverter 45 is at Hi, the output from the inverter 46 is set to Low and the P- MOSFET (41) is set in a continuous state (ON). Consequently, in this state, the output from the rectangular wave amplifier is at Hi as long as the output from the output voltage waveform source circuit is at Hi and is at Low as long as the output from the output voltage waveform source circuit is at Low.

Next, when the output from the VCO 14 is set to Low, the output from the inverter 43 is set to Hi and the N- MOSFET (42) enters a continuous state (ON). At the same time, since the transistor 44 enters a discontinuous state (OFF), setting the output from the inverter 45 to Low and the output from the inverter 46 to Hi, the P- MOSFET (41) enters a discontinuous state (OFF). As a result, in this state, the output terminal of the rectangular wave amplifier remains at Low even when the output from the variable voltage source circuit is at Hi.

It is to be noted that R8, C3 and D3 constitute a circuit in which a delay occurs only at a fall and R9, C4 and D4 constitute a circuit in which a delay occurs only at a rise, so that a time lag is created to ensure that the N- MOSFET (42) is turned off before the P- MOSFET (41) is turned on when the output from the VCO is set to Hi and that the N- MOSFET (42) is turned on after the P- MOSFET (41) is turned off when the output from the VCO is set to Low.

Thus, since the frequency in the output F from the VCO 14 fluctuates as indicated in FIG. 7, switching occurs between the FETs (41 and 42) in conformance to the fluctuations, and the output from the rectangular wave amplifier 15 is set to Hi only when the output from the variable voltage source circuit 10 is at Hi and the output from the VCO 14 is at Hi. As a result, when a signal by the waveform indicated with F in FIG. 7 is inputted to the rectangular wave amplifier, the waveform indicated by G in FIG. 7 is produced.

The source-off detection circuit 16 is constituted by connecting an inverter 47 to the output line from the variable voltage source circuit 10. In other words, when the output from the variable voltage source circuit 10 is set to Low, the logic level of the output from the inverter 47 becomes positive.

In the output switching circuit 17, the output from the source-off detection circuit 16 is inputted to a decode counter 48 and every time the source-off detection circuit 16 detects that the source is off, output terminals (Q0~Q3) at the decode counter 48 are sequentially switched to Hi. These output terminals (Q0~Q3) of the decode counter 48 are connected to the output line from the rectangular wave amplifier 15 via FETs (49) and amplifiers 50.

Thus, when one of the output terminals (Q0~Q3) of the decode counter 48 is set to Hi, its output is inputted to the gate terminal of the corresponding FET (49) via the corresponding amplifier 50 and it becomes possible to provide the output signal from the rectangular wave amplifier 15 only to the speakers in the corresponding output system. Then, when the output from the variable voltage source circuit 10 is turned off and the next output terminal at the decode counter 48 is switched to Hi, it becomes possible to provide the output signal from the rectangular wave amplifier 15 to the speakers of the newly switched output system. In this manner, the output from the rectangular wave amplifier 15 can be provided to different speakers sequentially with the switching at the decode counter 48, and when the output from the variable voltage source circuit 10 is turned on, the electrical signal indicated by G in FIG. 7 is provided only to the speakers that have been switched to one of the outputs (1~4) only during the period of time over which the output from the variable voltage source circuit is in the ON state to be converted to a sound wave motion that includes mechanical vibration, i.e., ultrasonic waves.

In the structure described above, a signal for turning on/off the source is generated at the frequency divider circuit 7 from a random pulse generated at the low range noise generating circuit 6 and, with this signal, the source mute circuit 8 is operated to turn on/off the output voltage from the variable voltage source circuit 10. The triangular wave generated at the triangular wave generating circuit 12 is converted by the VCO 14 to a pulse signal which sweeps without rapidly deviating from a specific frequency range, and the rectangular waves amplifier 15 converts the output from the variable voltage source circuit 10 during an on period to an electrical signal with the same frequency changes, based upon the pulse signal from the VCO. In addition, during a period over which the output from the variable voltage source circuit 10 is off, the off state is detected by the source-off detection circuit 16 and the speaker to which the output from the rectangular wave amplifier 15 is to be provided is selected by the output switching circuit 17.

Consequently, the frequency of the electrical signal provided to the individual speakers is achieved by extracting a portion of a frequency that sweeps within a specific frequency range in a stable manner, and while the frequency is not changed rapidly, since the timing with which the speakers are switched over and the period over which that portion of the frequency is extracted depend upon the low range noise, ultrasonic waves with random frequencies are generated within these restrictions to prevent the pest animals, such as rats, from becoming accustomed to the sound.

Moreover, since the switching over of the output terminals of the speakers is performed during the period of time over which the source remains off, noise that would otherwise be generated from the speakers, when switching between the output systems, is eliminated. Also, since a plurality of speakers are employed to be sequentially selected in correspondence to individual output systems, it becomes possible to drive a number of speakers with the same source capacity as that in the prior art. As measures against noise, it is also conceivable to employ a method in which the output signal is muted simply by using an analog amplifier. This method, however, is not suited for driving a plurality of speakers since an analog amplifier provides inferior power conversion efficiency. In addition, if the frequency is simply caused to sweep and a rectangular wave amplifier is employed, it is not possible to drive a plurality of speakers in the method in the prior art in which ultrasonic waves are continuously outputted. This structure is characterized in that a plurality of speakers can be driven as well as achieving prevention of noise in view of those factors described above.

While, in reference to the example described above, a structure in which the input terminal of the VCO 14 and the output terminal of the triangular wave generating circuit 12 are connected to each other via a changeover switch 51 is presented, by connecting the integrating circuit 13 and the VCO 14, the output F from the VCO is caused to sweep with a random frequency period, thereby making it possible to further promote the generation of ultrasonic waves with random frequencies.

Namely, the output voltage from the integrating circuit 13, which changes randomly in correspondence to the output from the low range noise generating circuit 6, as indicated by E in FIG. 8, for instance, and the VCO 14 forms a waveform such as indicated by F in FIG. 8 by randomly changing the oscillating frequency with this voltage waveform. Subsequently, the same processing as that described above is performed and ultrasonic waves with randomly sweeping frequencies are outputted while the output systems are sequentially switched over.

In such a structure, since the frequency is caused to change over time at the same rate as that in the case of the triangular wave, no rapid change in the frequency occurs just as in the case of the triangular wave, which means that no impulse wave results. However, since the frequency variable range changes randomly, the frequency in the electrical signal becomes dependent upon noise and is set more randomly compared to the case of the triangular wave and, as a result, an even greater effect in intimidating and repulsing pest animals such as rats is achieved.

Moreover, since the level of the electrical signal provided to the speakers can be adjusted at the voltage adjustment variable resistor 26 for each output terminal, regardless of whether a triangular wave or an integrated waveform is employed, the outputs of the speakers and the number of speakers that are driven can be adjusted in correspondence to the particularities of the location where the apparatus according to the present invention is installed. Such adjustment includes freely selecting the speakers at which the output of the ultrasonic waves is to be halted.

It is to be noted that, while in the structural example described above, four output systems are provided and one transducer 1 is connected to each output system so that the four of them can be switched sequentially, theoretically there are no restriction imposed upon the number of output systems to be provided as long as there are two or more. The number of transducers to be connected to each output system, too, may be two or more as long as the capacity of the source supports that number of transducers. In practical use, it is desirable to provide 2~4 transducers at each output system. Furthermore, as long as the capacity of the source permits, two or more output systems may be switched over at the same time instead of switching among a plurality of output systems one system at a time.

As has been explained, according to the present invention, since a plurality of transducers to which power is supplied from a common source are selected with random cycles in units of output systems and an electrical signal with a frequency that changes randomly can be provided to the transducers for a random output period, an advantage of effectively intimidating and repulsing pest animals such as rats can be achieved while preventing them from becoming accustomed to the ultrasonic waves, as happens with the prior art. In addition, since the transducers to which the electrical signal is provided are selected by switching over the output systems, a greater number of transducers can be driven while employing the same source capacity as that in the prior art. Moreover, since the switching of the output systems is performed during source output off periods, noise that would otherwise be generated from the transducers, when the output systems are switched, is eliminated.

In addition, since the frequency of the electrical signal provided to the transducers is made to change over time at a specific rate, transducers with lower frequency response characteristics can be employed as long as they are of the type that are normally used in the ultrasonic wave range. This contributes to a reduction in cost when installing the apparatus according to the present invention together with the fact that a large number of transducers can be supported with a common source.

Furthermore, if a means for adjusting the output level of the electrical signal is provided in correspondence to each output system, it is possible to make free settings such as the change in the output level and the pause in the output at each output system depending upon the installation location, thereby achieving a pest animal repulsing apparatus with a higher degree of versatility.

What is claimed is:

1. The pest animal repulsing apparatus comprising:

transducers that convert an electrical signal to a mechanical vibration;

a random signal generating unit that generates a random signal;

a source output on/off control unit that turns an output from a source on and off based upon an output from said random signal generating unit;

a frequency varying unit that causes changes in frequency over time of the electrical signal provided to said transducers at a specific rate; and an output switching unit connected with said transducers and having two or more output systems for receiving power supplied from the source, wherein said output switching unit switches among said output systems to which the electrical signal is to be provided every time the output from the source is turned off and provides the electrical signal to said transducers in said output systems that have been switched to when the output from the source is turned on.

2. The pest animal repulsing apparatus according to claim 1, wherein:

said output switching unit, which includes a source-off detection circuit comprising a logic gate that outputs a positive logical level when the output from the source is off, a decode counter to which an output signal from said source-off detection circuit is inputted, and a switching element connected to an output terminal of said decode counter to interrupt said output systems, switches over said output systems sequentially every time the output from the source is turned off.

3. The pest animal repulsing apparatus according to claim 1, wherein:

said frequency varying unit includes a triangular wave generating circuit for generating a triangular wave; and the electrical signal whose frequency changes over time is generated by varying an oscillating frequency in correspondence to an output voltage from said triangular wave generating circuit.

4. The pest animal repulsing apparatus according to claim 1, wherein:

said frequency varying unit includes an integrating circuit which integrates a signal that corresponds to an output from said random signal generating unit and changes randomly; and an electrical signal whose frequency changes over time is generated by varying the oscillating frequency in correspondence to an output voltage from said integrating circuit.

5. The pest animal repulsing apparatus according to claim 1, wherein:

a means for adjusting an output level of the electrical signal is provided in correspondence to each of said output systems.

6. The pest animal repulsing apparatus according to claim 5, wherein:

the electrical signal provided to said transducers is obtained by converting the output from the source, using said frequency varying unit, into a signal whose frequency changes, and a voltage level of the electrical signal is adjusted by an output voltage adjuster which is provided in correspondence to each of said output systems.

7. A pest animal repulsing apparatus comprising:

speakers supplied with power from a common source that convert an electrical signal to a sound wave motion;

a random signal generating unit that generates a random signal by generating noise;

a source output on/off control unit that turns an output from the common source on and off based upon an output from said random signal generating unit;

a frequency varying unit that generates a pulse signal whose frequency sweeps at a specific rate and causes changes in frequency of the electrical signal provided to said speakers based upon the pulse signal; and an output switching unit connected with said speakers and having two or more output systems for receiving power supplied from the common source and having a source-off detection circuit that detects that the output from the common source is in an off state, wherein said output switching unit sequentially switches over said output systems to which the electrical signal is to be provided every time the output from the common source is turned off and provides the electrical signal to said output systems that have been switched to when the output from the common source is turned on.

8. The pest animal repulsing apparatus according to claim 7, wherein:

said output switching unit, which includes a source-off detection circuit comprising a logic gate that outputs a positive logical level when the output from the common source is off, a decode counter to which an output signal from said source-off detection circuit is inputted, and a switching element connected to an output terminal of said decode counter to interrupt said speakers, switches over said speakers sequentially every time the output from the common source is turned off.

9. The pest animal repulsing apparatus according to claim 7, wherein:

said frequency varying unit includes a triangular wave generating circuit for generating a triangular wave; and the electrical signal whose frequency changes over time is generated by varying an oscillating frequency in correspondence to an output voltage from said triangular wave generating circuit.

10. The pest animal repulsing apparatus according to claim 7, wherein:

said frequency varying unit includes an integrating circuit which integrates a signal that corresponds to an output from said random signal generating unit and changes randomly; and the electrical signal whose frequency changes over time is generated by varying an oscillating frequency in correspondence to an output voltage from said integrating circuit.

11. The pest animal repulsing apparatus according to claim 7, wherein:

a means for adjusting an output level of the electrical signal is provided in correspondence to each of said output systems.

12. The pest animal repulsing apparatus according to claim 7, wherein:

the electrical signal provided to said output systems is obtained by converting the output from the common source, using said frequency varying unit, into a signal whose frequency changes, and a voltage level of the electrical signal is adjusted by an output voltage adjuster which is provided in correspondence to each of said output systems.

* * * * *